(12) United States Patent
Arora et al.

(10) Patent No.: US 12,494,335 B2
(45) Date of Patent: Dec. 9, 2025

(54) CONTROL SYSTEM FOR SEPARABLE LOAD-BREAK ELECTRICAL CONNECTORS

(71) Applicant: Eaton Intelligent Power Limited, Dublin (IE)

(72) Inventors: Sonal Arora, Manendragarh (IN); Aarti Kothe, Solapur (IN); Nilesh Kadam, Pune (IN); Mayank Jain, Nand Nagari (IN); Ragini Jain, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 18 days.

(21) Appl. No.: 17/987,024

(22) Filed: Nov. 15, 2022

(65) Prior Publication Data
US 2023/0178322 A1   Jun. 8, 2023

(30) Foreign Application Priority Data
Dec. 2, 2021   (IN) .............................. 202111055883

(51) Int. Cl.
*H01H 71/10*   (2006.01)
*G01R 15/18*   (2006.01)
*G01R 19/00*   (2006.01)

(52) U.S. Cl.
CPC ........... *H01H 71/10* (2013.01); *G01R 15/181* (2013.01); *G01R 19/0092* (2013.01)

(58) Field of Classification Search
CPC .... G01R 19/0092; G01R 15/181; H02H 3/26; H01H 9/54; H01H 33/027; H01H 33/008; H01H 71/10

(Continued)

(56) References Cited

U.S. PATENT DOCUMENTS

| 6,459,557 B1 | 10/2002 | Haensgen et al. |
| 6,753,493 B2 | 6/2004 | Rhein et al. |

(Continued)

FOREIGN PATENT DOCUMENTS

| CN | 104158142 A | 11/2014 |
| CN | 207938828 U | 10/2018 |

(Continued)

OTHER PUBLICATIONS

Machine translation of Findeisen German Patent Document DE 102017213709 A1 Feb. 2019 (Year: 2019).*

(Continued)

*Primary Examiner* — Kevin J Comber
(74) *Attorney, Agent, or Firm* — DiBerardino McGovern IP Group LLC

(57) ABSTRACT

An apparatus includes: a plurality of separable load break devices, each separable load break device including: a resettable current interruption device associated with operating states, the operating states including at least a first operating state that prevents current flow in the resettable current interruption device and a second operating state that allows current flow in the resettable current interruption device; a switch control configured to control the operating state of the resettable current interruption device; a connection interface configured to mechanically connect the load break device to a separate electrical device and to electrically connect the resettable current interruption device to the separate electrical device; and an electrical interface configured to electrically connect the resettable current interruption device to a load. The apparatus also includes a control system configured to provide electrically ganged operation of the plurality of load break devices.

18 Claims, 5 Drawing Sheets

(58) Field of Classification Search
USPC .......................................................... 361/211
See application file for complete search history.

(56) References Cited

U.S. PATENT DOCUMENTS

| | | | |
|---|---|---|---|
| 7,215,228 B2 | 5/2007 | Rhein | |
| 7,305,335 B2 | 12/2007 | Warren | |
| 7,495,574 B2 | 2/2009 | Rocamora et al. | |
| 7,534,976 B2 | 5/2009 | Crutcher | |
| 8,334,738 B2 | 12/2012 | Smith et al. | |
| 8,879,218 B2 | 11/2014 | Tomimbang | |
| 9,373,912 B1 | 6/2016 | Juds et al. | |
| 9,431,198 B2 | 8/2016 | Reuber et al. | |
| 9,472,892 B1 | 10/2016 | Rollmann et al. | |
| 9,478,900 B1 | 10/2016 | Juds et al. | |
| 9,653,858 B2 | 5/2017 | Hanke et al. | |
| 9,742,126 B2 | 8/2017 | Juds et al. | |
| 9,819,117 B2 | 11/2017 | Rollmann et al. | |
| 9,819,118 B2 | 11/2017 | Juds et al. | |
| 10,418,200 B2 | 9/2019 | Spence et al. | |
| 2002/0135964 A1* | 9/2002 | Murray | H01H 33/6661 361/131 |
| 2005/0082260 A1 | 4/2005 | Martin | |
| 2006/0126257 A1 | 6/2006 | Domo et al. | |
| 2015/0116878 A1 | 4/2015 | Richard et al. | |
| 2017/0018872 A1 | 1/2017 | Rollmann et al. | |
| 2017/0018887 A1 | 1/2017 | Juds et al. | |
| 2017/0294275 A1* | 10/2017 | Spence | H04B 3/54 |
| 2018/0062306 A1 | 3/2018 | Juds et al. | |
| 2019/0296542 A1 | 9/2019 | Kromrey et al. | |
| 2021/0098214 A1 | 4/2021 | Carlson et al. | |
| 2021/0203184 A1* | 7/2021 | Vankirk Simmons | H02J 13/00028 |

FOREIGN PATENT DOCUMENTS

| | | |
|---|---|---|
| CN | 111095689 A | 5/2020 |
| CN | 112185752 A | 1/2021 |
| DE | 2822773 A | 11/1979 |
| DE | 102017206929 A | 10/2018 |
| DE | 102017213709 A1 * | 2/2019 |
| DE | 102018204847 B3 | 9/2019 |
| DE | 102018127230 A | 4/2020 |
| EP | 2682973 A1 | 1/2014 |
| WO | 2006/028968 A1 | 3/2006 |
| WO | 2019029924 A1 | 2/2019 |

OTHER PUBLICATIONS

Pia Dahl, European International Searching Authority, Invitation to Pay Fees with Partial International Search Report and Provisional Written Opinion, counterpart PCT Application No. PCT/EP2022/025537, mailed Feb. 15, 2023, 13 pages total.

Jose Miguel Nieto, European International Searching Authority, International Search Report and Written Opinion, counterpart PCT Application No. PCT/EP2022/025537, mailed Jun. 6, 2023, 16 pages total.

* cited by examiner

CONTROL SYSTEM FOR SEPARABLE LOAD-BREAK ELECTRICAL CONNECTORS

CROSS-REFERENCE TO RELATED APPLICATION

This application claims priority to Indian Patent Application No. 202111055883, filed Dec. 2, 2021, and titled CONTROL SYSTEM FOR SEPARABLE LOAD-BREAK ELECTRICAL CONNECTORS, which is incorporated herein by reference in its entirety.

TECHNICAL FIELD

This disclosure relates to a control system configured to control separable load-break electrical connectors.

BACKGROUND

An electrical connector is used to connect electrical transmission and distribution equipment and electrical sources within an electrical system.

SUMMARY

In one aspect, an apparatus includes: a plurality of separable load break devices, each separable load break device including: a resettable current interruption device associated with operating states, the operating states including at least a first operating state that prevents current flow in the resettable current interruption device and a second operating state that allows current flow in the resettable current interruption device; a switch control configured to control the operating state of the resettable current interruption device; a connection interface configured to mechanically connect the load break device to a separate electrical device and to electrically connect the resettable current interruption device to the separate electrical device; and an electrical interface configured to electrically connect the resettable current interruption device to a load. The apparatus also includes a control system configured to provide electrically ganged operation of the plurality of load break devices.

Implementations may include one or more of the following features.

The resettable current interruption device may include a vacuum interrupter, and the switch control may include: an actuator coupled to a movable rod of the vacuum interrupter; and a driving circuit configured to control the actuator.

Each load break device also may include: a current path electrically connected to the resettable current interruption device and to the electrical interface; and a sensor system configured to monitor and/or harvest electrical power that flows in the current path. The control system also may be coupled to the sensor system in each load break device, and the control system may be configured to receive electrical energy from the sensor system in each load break device. Each sensor system may include one or more current sensors. The one or more current sensors may include a current transformer and/or a Rogowski coil. In some implementations, the control system is further configured to determine whether a fault exists in the current path of one or more of the load break devices based on the received electrical energy. The control system may be further configured to control the switch control in each load break device such that the resettable current interruption device in each load break device is in the first operating state if a fault exists in the current path of one or more of the load break devices. The control system may include: a power supply module configured to receive and store electrical energy from the sensor systems; and a microcontroller configured to analyze the electrical energy from the sensor systems to determine whether a fault exists in one or more of the load break devices. The power supply module may be further configured to amplify the electrical energy from the sensor systems.

The control system may be separate from all of the load break devices. The control system may be enclosed in a Faraday cage.

In another aspect, a control system configured to control a plurality of load break devices includes: a power supply module configured receive electrical energy from a plurality of load break devices, the power supply module including: a boost module configured to amplify the received electrical energy; and an energy storage apparatus configured to store the amplified electrical energy; one or more electronic processors; and an electronic memory, the electronic memory storing instructions that, when executed, cause the one or more electronic processors to: access information related to a current path of each of the load break devices; determine whether a fault exists in one or more of the load break devices based on the accessed information; and control all of the load break devices if a fault exists in one or more of the load break devices.

Implementations may include one or more of the following features. The electronic controller may be powered by the electrical energy stored in the energy storage apparatus. The control system also may include an input/output (I/O) module.

The electronic controller may be a microcontroller.

The information related to the current path of each of the load break devices may be a measured AC current value in each current path. The measured AC current value may include a plurality of current measurements over time in each current path.

In another aspect, an indication of one or more properties of electrical power flow in a plurality of separable load-break electrical connectors is received; the indication of the one or more properties is analyzed to determine whether a fault exists in any of the plurality of separable load-break electrical connectors; and if a fault exists in any of the separable load-break electrical connectors, a switch control in each of the separable load-break electrical connectors is commanded to open a resettable current interruption device in the separable load-break electrical connector.

Implementations of any of the techniques described herein may include a system, an apparatus, a control system, an enclosure for a control system, an assembly, an electrical connector, and/or a method. The details of one or more implementations are set forth in the accompanying drawings and the description below. Other features will be apparent from the description and drawings, and from the claims.

DRAWING DESCRIPTION

DETAILED DESCRIPTION

Figure 1:
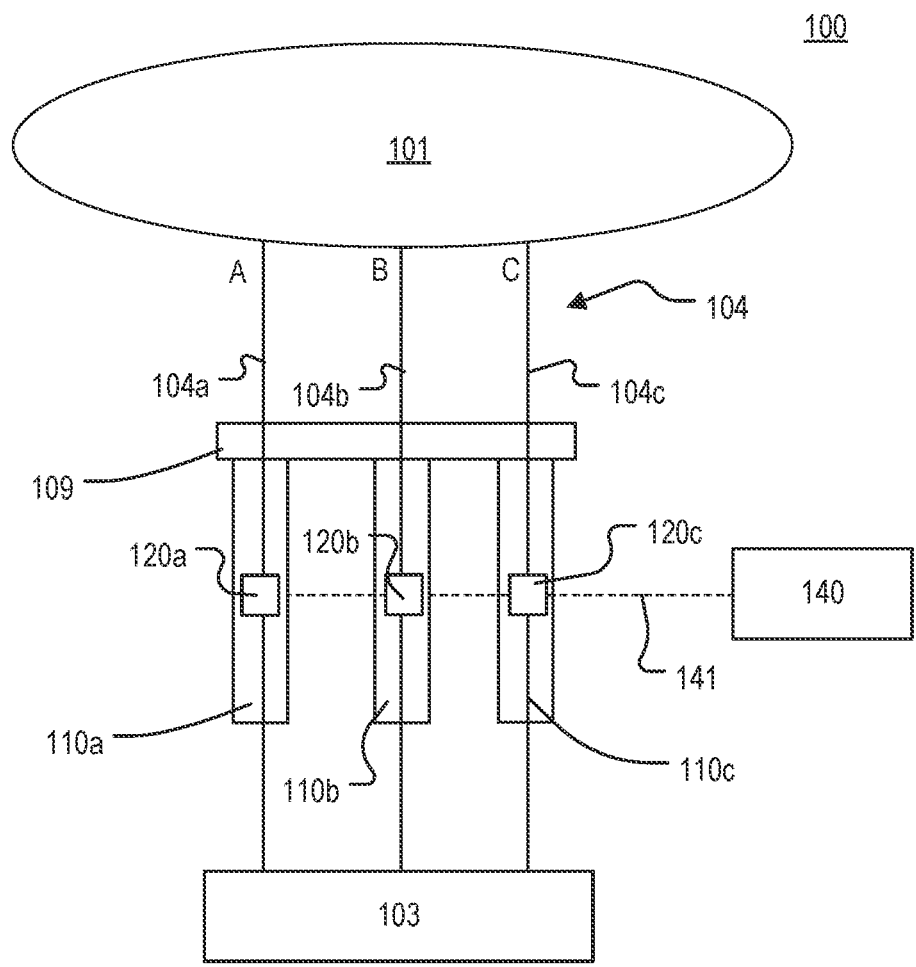
FIG. 1 is a block diagram of a three-phase alternating current (AC) electrical power system that includes load-break electrical connectors.

FIG. 1 is a block diagram of a three-phase alternating current (AC) electrical power system 100. The system 100 includes an AC electrical grid 101 that distributes AC electrical power to loads 103 via a distribution path 104. The loads 103 may be any device or apparatus that uses electricity in an industrial, commercial, and/or residential facility. The electrical grid 101 may have an operating voltage of, for example, at least 1 kilovolt (kV), 12 kV, up to 34.5 kV, up to 38 kV, or 69 kV or higher, and may operate at a system frequency of, for example, 50 or 60 Hertz (Hz). All or portions of the grid 101 may be underground.

The distribution path 104 is any type of mechanism or device that carries electricity. For example, the distribution path 104 may include one or more transmission lines, electrical cables, electrical wires, transformers, or a combination of such devices. The grid 101 also includes sources of AC electricity and other equipment that transfer and/or control electricity such as, for example, generators, substations, renewable energy sources, capacitor banks, transformers, and/or power stations.

The distribution path 104 includes three conductors 104a, 104b, 104c, each of which is associated with a respective phase A, B, C of the three-phase AC power system 100. The system 100 also includes electrical connectors 110a, 110b, and 110c. The electrical connectors 110a, 110b, 110c are separable electrical connectors that are configured to be connected to and disconnected from bushings of a device 109. The electrical device 109 may be, for example, a sectionalizer, capacitor bank, or a transformer that is contained in a cabinet. The cabinet may be underground or pad mounted. Each electrical connector 110a, 110b, 110c includes a respective resettable current interrupting device 120a, 120b, 120c. The resettable current interrupting devices 120a, 120b, 120c are configured to control the electrical connection between the loads 103 and the grid 101. The electrical connectors 110a, 100b, 110c are coupled to a control system 140 via a connection 141 (shown with a dashed line). The connection 141 may be, for example, a wire or cable, or any other connection that is capable of transmitting electrical power, data, information, and commands. The control system 140 is configured for common control of the electrical connectors 110a, 110b, 110c.

As discussed in greater detail below, as compared to a configuration in which each electrical connector 110a, 110b, 110c has a local control system, the control system 140 provides space savings, has simpler wiring and connections, includes fewer components, and has a lower overall cost. Moreover, the control system 140 also provides superior performance and/or additional functionality as compared to a system in which each electrical connector 110a, 110b, 110c has a local control system. For example, the control system 140 provides common control of all of the current interrupting devices 120a, 120b, 120c and allows the electrical connectors 110a, 110b, 110c to be operated as a group in an electrically ganged manner. Thus, the control system 140 may be configured to open all of the resettable current interrupting devices 120a, 120b, 120c in response to detecting a fault on any of the phases A, B, C. A fault is an abnormal condition that may be caused by equipment malfunction, moisture or debris ingress, or extreme weather. A fault generally causes a current and/or voltage surge on the conductors 104a, 104b, 104c.

Furthermore, the control system 140 includes a boost converter that amplifies or boosts currents and/or voltages received from the electrical connectors 110a, 110b, 110c. This allows the electrical connectors 110a, 110b, 110c to output relatively low current and voltages (for example, ones or tens of milliamps or ones or tens of millivolts) to the connection 141, thereby reducing the amount of electromagnetic interference that could otherwise be present at the connection 141. Thus, the control system 140 allows for a simpler and more robust connection 141.

The features of an electrical connector that may be used as the electrical connectors 110a, 110b, 110c are discussed before discussing the control system 140 in greater detail.

Figure 2A:
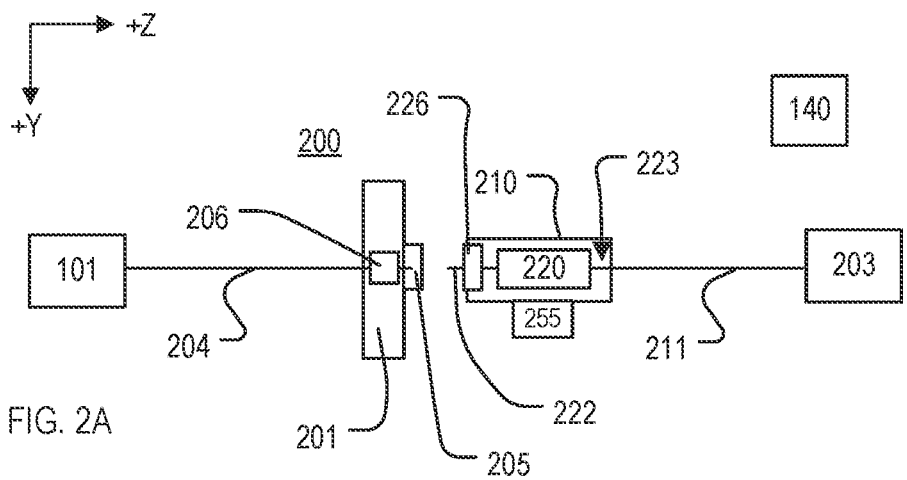
FIG. 2A is a block diagram of an alternating current (AC) electrical power system that includes a load-break electrical connector.

FIG. 2A is a block diagram of an alternating current (AC) electrical power system 200 that includes a load-break electrical connector 210. The electrical connector 210 is an example of an electrical connector that may be used as the electrical connector 110a, 110b, and/or 110c (FIG. 1). The electrical connector 210 is a relatively compact device that an operator can position and install manually, and the electrical connector 210 is generally small and light enough to be manually moveable, with, for example, a hotstick. The electrical connector 210 may be capable of interrupting currents of 200 Amperes (A), 400 A, 600 A, between 200 A and 600 A, or greater than 600 A. The electrical connector 210 may be configured to have an AC operating voltage of, for example, 15 kilovolts (kV), 25 kV, 27 kV, 35 kV, 38 kV, or greater. In some implementations, the electrical connector 210 is rated to interrupt current on a 15 kV or 27 kV, 200 A system and/or on a 38 kV, 400 A system.

The electrical connector 210 includes a resettable current interrupting device 220 on a current path 223. The resettable current interrupting device 220 has an open state in which current cannot flow in the current path 223 and a closed state in which current can flow in the current path 223. The resettable current interrupting device 220 is capable of conducting current and interrupting current, and is also capable of being reset or controlled to conduct current after interrupting current flow. In other words, the resettable current interrupting device 220 conducts current under ordinary conditions, opens and interrupt current flow (for example, in the presence of a fault condition), and then may be closed again such that current flow may resume in the current path 223. Thus, unlike a fuse or other type of non-resettable current interrupting device, the resettable current interrupting device 220 does not have to be replaced after interrupting current. A vacuum interrupter is an example of a component of a resettable current interrupting device.

Figure 5A:
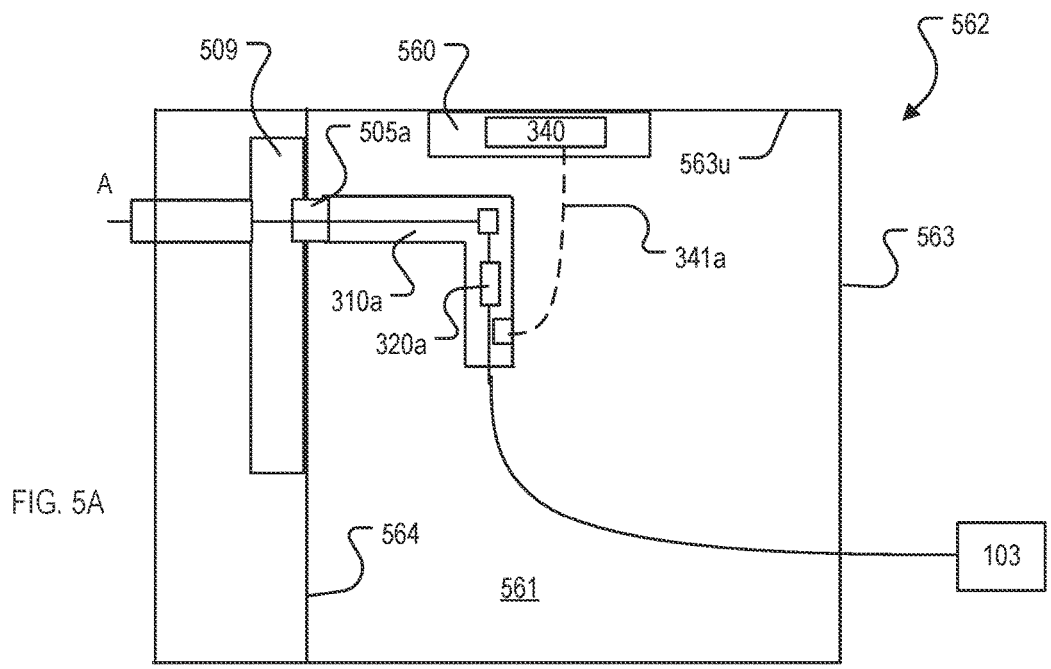
FIG. 5A is a side block diagram of an interior of the cabinet that includes load-break electrical connectors.

The electrical connector 210 provides resettable current interrupting functionality in a relatively compact arrangement that can be manually installed on and removed from a bushing 205 of an external electrical device or structure 209. Furthermore, the electrical connector 210 may be implemented in a variety of arrangements. For example, some implementations of the electrical connector 210 are parallel arrangements in which the resettable current interrupting device 220 extends generally along the same direction as the bushing 205 extends (the Z axis in the example of FIG. 2A). In other implementations, the resettable current interrupting device 220 extends generally along a different direction than the direction in which the bushing 205 extends. For example, the electrical connector 210 may be implemented such that the current interrupting device 220 extends along the Y axis. The electrical connector 210 may be an elbow connector (such as shown in FIG. 5A). In other implementations, the electrical connector 210 has a T-shape in the Y-Z plane. The variety of configurations and arrangements provide an end-user with a greater number of options to meet the requirements of their particular application.

Moreover, the electrical connector 210 includes a sensor system 255 that harvests or obtains electrical energy from electrical current that flows in the current path 223 and provides the harvested energy to various components within the electrical connector 210 and the control system 140. Thus, the electrical connector 210 and the control system 140 are self-powered and can operate when electrical current is not flowing in the current path 223. The sensor system 255 also may provide indications of one or more properties of the current that flows in the current path 223. For example, the sensor system 255 may produce an indication of an amplitude, frequency, and/or phase of the current that flows in the current path 223.

The electrical connector 210 includes a mechanical interface 226 that is attachable to and removable from the bushing 205. The mechanical interface 226 surrounds a conductor 222 that is electrically connected to the resettable current interrupting device 220. The current path 223 includes the conductor 222 and the current interrupting device 220. The resettable current interrupting device 220 is also electrically connected to a load 203 via a load-side conductor 211. The load 203 is any type of device that utilizes, produces, and/or stores electricity. For example, the load 203 may be machinery, a lighting system, one or more motors, a transformer, or a combination of such devices. The load 203 may be a device that is capable of producing, consuming, and/or storing electricity. For example, the load 203 may be a battery. The load 203 may be in a residential, commercial, and/or industrial setting.

The bushing 205 is on the electrical device or structure 209, which is separate and distinct from the electrical connector 210. For example, device or structure 209 may be a transformer, a sectionalizing cabinet, or a junction. The bushing 205 surrounds an electrical conductor 206 that is part of the distribution path 204. The mechanical interface 226 is configured such that, when the mechanical interface 226 is mounted to the bushing 205, the electrical connector 210 is held to the bushing 205 and the electrical conductor 222 is electrically connected to the conductor 206 and the distribution path 204. For example, the mechanical interface 226 may be held to the bushing 205 with an interference fit. When the current interrupting device 220 is in the closed state, current flows in the current path 223, and the grid 101 is electrically connected to the load 203. When the current interrupting device 220 is in the open state, current does not flow in the current path 223, and the grid 101 is disconnected from the load 203.

Figure 2B:
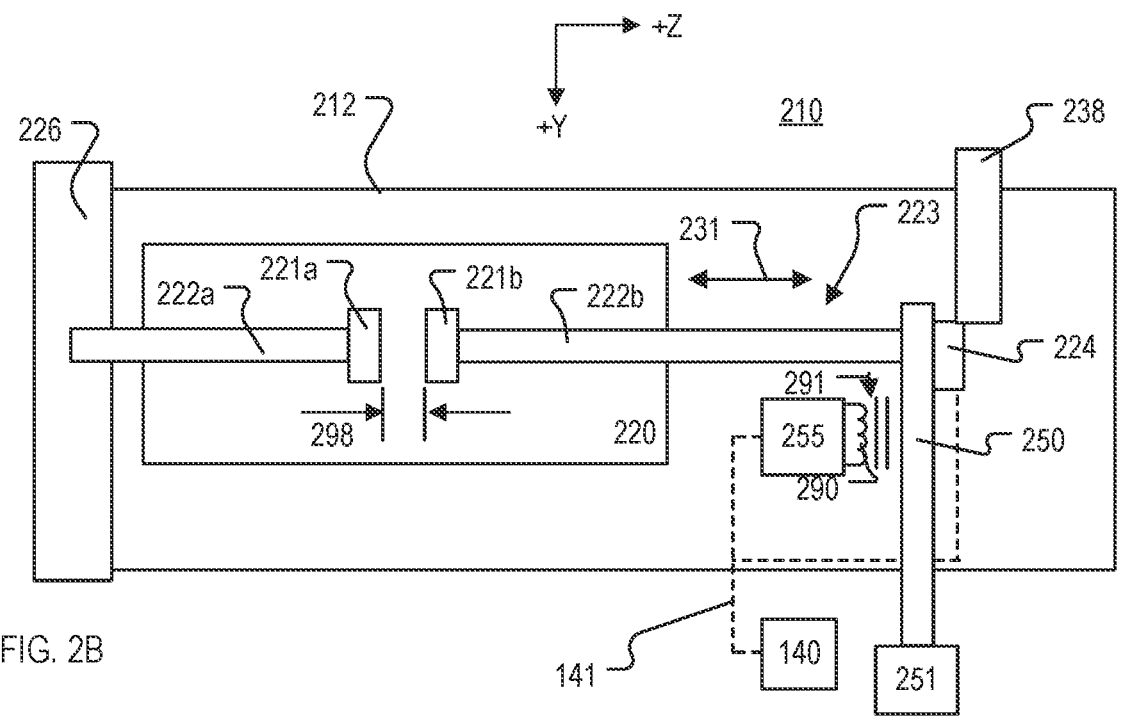
FIG. 2B is a side block diagram of a load-break electrical connector.

FIG. 2B is a block diagram that shows additional details of the electrical connector 210. In the example shown in FIG. 2B, the resettable current interrupting device 220 is a vacuum interrupter and is referred to as the vacuum interrupter 220.

Figure 2C:
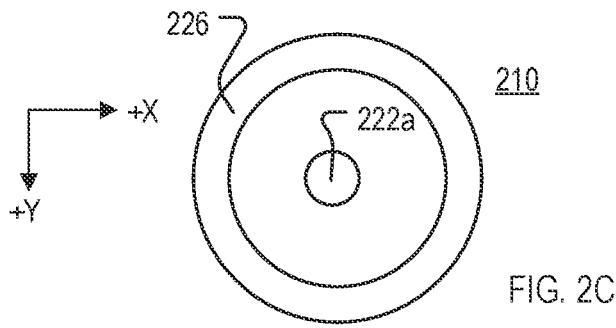
FIG. 2C is a block diagram of an end of the load-break electrical connector of FIG. 2B.

The electrical connector 210 includes a housing 212 made of an electrically insulating material, such as, for example, hardened rubber, a polymer material, or a molded peroxide-cured EPDM. The housing 212 is a three-dimensional body. Referring also to FIG. 2C, the mechanical interface 226 is at an end of the housing 212 and surrounds a stationary rod 222a of the vacuum interrupter 220. The mechanical interface 226 may be part of the housing 212. The mechanical interface 226 has a shape in the X-Y plane that corresponds to the shape of the bushing 205 such that the mechanical interface 226 is mechanically mountable to the bushing 205. In the example of FIGS. 2B and 2C, the mechanical interface 226 has a circular cross-section in the X-Y plane. The housing 212 is made of an electrically insulating material, such as, for example, rubber. The housing 212 encloses the vacuum interrupter 220, a switch control 224, and the sensor system 255.

The vacuum interrupter 220 includes a stationary contact 221a and a moveable contact 221b. The contact 221a is at an end of the stationary rod 222a, and the moveable contact 221b is at an end of a moveable rod 222b. The contacts 221a and 221b and the rods 222a and 222b are made of an electrically conductive material such as, for example, copper, brass, tin, silver, gold, or a combination of such materials. When the contacts 221a and 221b are physically separated by a gap 298 (such as shown in FIG. 2B), current cannot flow through the vacuum interrupter 220 and the vacuum interrupter 220 is in the opened state. When the contacts 221a and 221b are in physical contact, current may flow through the vacuum interrupter 220 and the vacuum interrupter 220 is in the closed state.

The electrical connector 210 also includes a current exchange 250. The current exchange 250 is an electrically conductive element. One end of the current exchange 250 is attached to the moveable rod 222b and another end of the current exchange 250 is attached to an electrically conductive current port 251. The attachment points may be formed by soldering, welding, brazing, or any other technique that forms an electrical connection between two conductive elements. The current exchange 250 is able to move with the moveable rod 222b without becoming disconnected from the moveable rod 222b or the current port 251. For example, the current exchange 250 may be a flexible metal wire, a flexible metal cable, a metal strip, flexible braided wires, or a metal spring. In some implementations, the current exchange 250 is a laminated copper strip. The current port 251 is made of an electrically conductive material such as a metal or a metal alloy. In some implementations, the current port 251 is a braided copper cable, or a braided cable made of another metal. The current port 251 is configured to be attached to a separate device, such as, for example, the load-side conductor 211. The stationary rod 222a, the stationary contact 221a, the moveable contact 221b, the moveable rod 222b, the current exchange 250, and the current port 251 form the current path 223 through the electrical connector.

The switch control 224 is coupled to the moveable rod 222b and is controllable to cause the moveable rod 222b and moveable contact 221b to move relative to the stationary rod 222a and the stationary contact 221a. Thus, the switch control 224 controls the state of the vacuum interrupter 220. The switch control 224 may be, for example, an actuator. Any type of actuator may be used as the switch control 224. For example, the switch control 224 may be an electromagnetic actuator, a hydraulic actuator, and the switch control 224 may include a solenoid. The switch control 224 also includes associated components, such as driving circuitry that drives or moves the actuator to a pre-determined or commanded position. The switch control 224 also may include one or more sensors or other devices that are capable of measuring or sensing the position of the actuator and providing the position information to the control system 140. The actuator 224 also includes a manual control device 238. The manual control device 238 allows an end-user to manually operate the actuator 224. The manual control device 238 is accessible from the exterior of the electrical connector 210.

The sensor system 255 harvests electrical energy from the current path 223. In the example shown in FIG. 2B, the sensor system 255 is a current transformer (CT) that includes a coil 290 and a magnetic core 291. When electrical current flows in the current path 223, the magnetic core 291 magnetically couples the coil 290 to the current exchange 250, and an electrical current is induced in the coil 290. The induced current that flows in the coil 290 is provided to the control system 140. The sensor system 255 may step-down or reduce the magnitude of the current that flows in the current path 223. The sensor system 255 also may include associated components. For example, the sensor system 255 may include a resistive element that has a known impedance that converts the measured current from the sensor system 255 into a voltage that is provided to the control system 140.

Other implementations of the sensor system 255 are possible. For example, the sensor system 255 may be implemented with any type of sensor that measures electrical properties of the power that flows in the current path 223. For example, the sensor system 255 may include a Rogowski coil in addition to or instead of a CT. Moreover, the sensor system 255 may include a voltage sensor in addition to or instead of a current sensor.

The sensor system 255 and the switch control 224 are coupled to the control system 140 by the connection 141, which may be, for example, wires and/or cables. The sensor system 255 provides harvested electrical power and electrical measurements to the control system 140. The control system 140 provides commands to the switch control 224 and/or receives status information from the switch control 224. The sensor system 255 also may provide electrical power to the switch control 224.

Figure 3:
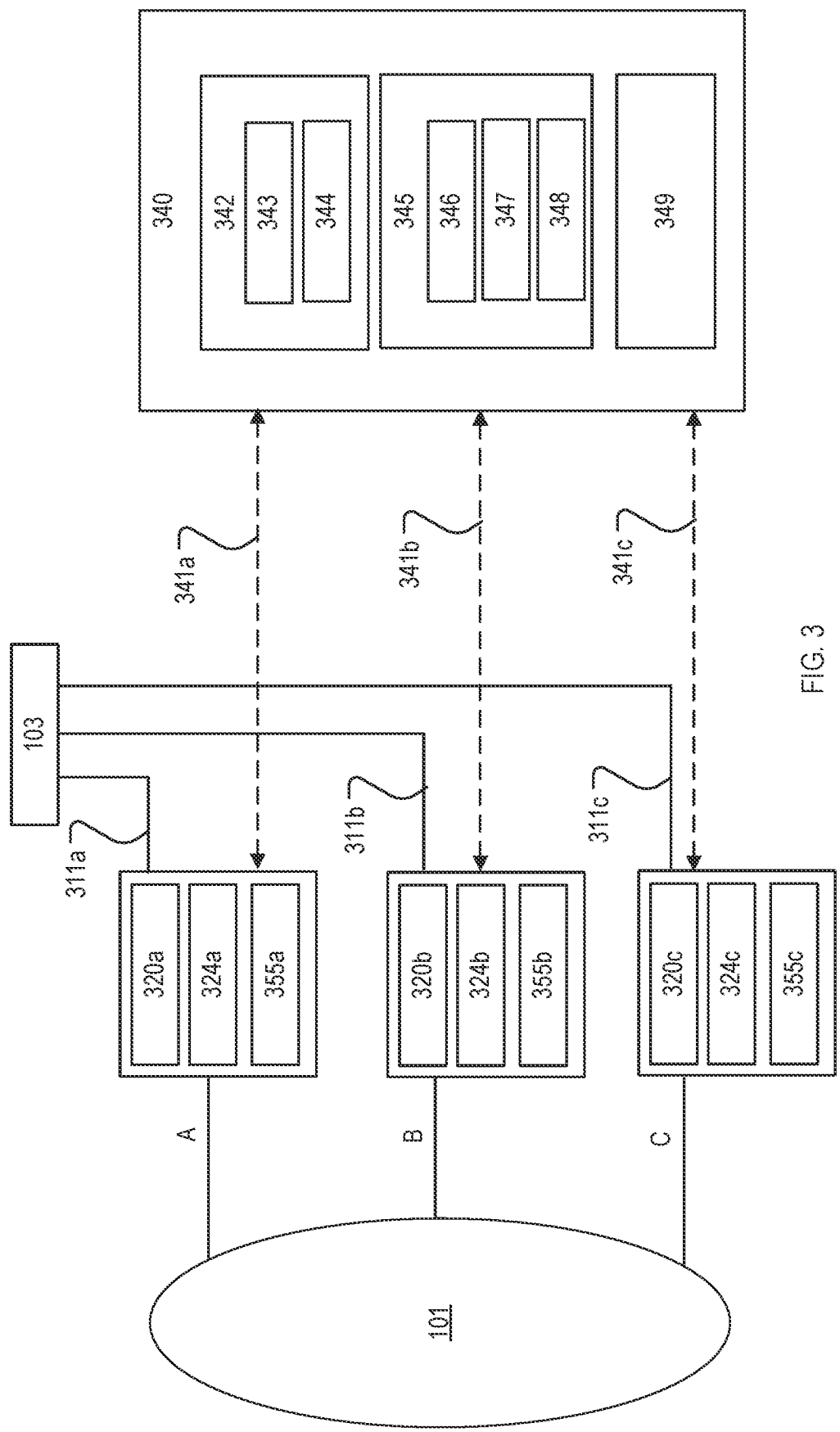
FIG. 3 is a block diagram of a control system that provides common control of three load-break electrical connectors.

FIG. 3 is a block diagram of a control system 340 that provides common control of three electrical connectors 310a, 310b, and 310c. The control system 340 is an example of an implementation of the control system 140, and the control system 340 may be used in the electrical power system 100 and the electrical power system 200. Each electrical connector 310a, 310b, 310c is a separable and resettable load-break electrical connector similar to the electrical connector 210 discussed with respect to FIGS. 2A-2C. Each electrical connector 310a, 310b, 310c includes a respective sensor system 355a, 355b, 355c; a respective resettable current interruption device 320a, 320b, 320c; and a respective switch control 324a, 324b, 324c. The electrical connectors 310a, 310b, 310c are electrically connected to a load 103 through respective load-side conductors 311a, 311b, 311b. The load 103 is electrically connected to the grid 101 when the resettable current interruption devices 320a, 320b, 320c are closed.

The control system 340 is coupled to the sensor systems 355a, 355b, 355c and to the switch controls 324a, 324b, 324c. The control system 340 receives electrical energy and data from the sensor systems 355a, 355b, 355c; and the control system 340 provides command signals to the switch controls 324a, 324b, 324c to open or close the respective resettable current interruption device 320a, 320b, 320c. The data from the sensor systems 335a, 335b, 335c may include, for example, numerical values that represent an amplitude of voltage and/or current measured at a particular time or a plurality of values represent the amplitude of voltage and/or current measured over a period of time.

The electrical connector 310a is positioned on the first phase A of the grid 101, the electrical connector 310b is positioned on the second phase B of the grid 101, and the electrical connector 310c is positioned on the third phase C of the grid 101. The electrical connectors 310a, 310b, and 310c are connected to the control system 340. The electrical connector 310a is connected to the control system 340 by an electrical connection 341a, the electrical connector 310b is connected to the control system 340 by an electrical connection 341b, and the electrical connector 310c is connected to the control system 340 by an electrical connection 341c. The electrical connections 341a, 341b, 341c are shown in dashed lines in FIG. 3, and the conductors 311a, 311b, 311c that carry load current and connect to the grid 101 are shown in solid lines. The electrical connections 341a, 341b, 341c may be wires and/or cables or any type of medium that is configured to carry electrical power, data, signals, and/or commands.

The control system 340 includes a power supply module 342 and an electronic control 345. In the implementation shown in FIG. 3, the control system 340 includes an interaction module 349. The control system 340 may be implemented without the interaction module 349.

The power supply module 342 includes a boost module 343 and an energy storage module 344. The power supply module 342 also may include additional modules and components. For example, the current and/or voltage received from the sensor systems 355a, 355b, 355c may be time-varying or AC voltages and/or currents and the power supply module 342 may include a rectifier or other AC to DC power converter that converts the received AC voltage and/or current into DC current and/or voltage and provides the DC current and/or voltage to the boost module 343. The power supply module 342 also may include a protection circuit between the power converter and the boost module 343 to protect the boost module 343 from power surges and/or spikes in the voltage and/or current. The protection circuit may include one or a combination of diodes (for example, Zener diodes), transistors (for example, metal-oxide-semiconductor field-effect transistor (MOSFET)), resistors, and/or other electronic components. Apart from protecting boost module from power surges, the protection circuit also may protect the energy storage module 344 from overcharging or undercharging.

The boost module 343 includes circuitry that increases an amplitude of a voltage and/or current signal received from the sensor systems 355a, 355b, 355b. For example, the boost module 343 may be implemented as a buck-boost converter or a flyback converter. By increasing the amplitude of the voltage and/or current from the sensor systems 355a, 355b, 355c at the control system 340, the voltage and/or current output from the sensor systems 355a, 355b, 355c may be a relatively low magnitude while still providing sufficient electrical energy for analysis and powering. Because the amplitude of the voltage and/or current output by the sensor systems 355a, 355b, 355c is relatively low (for example, ones or tens of milliamps or millivolts), the electrical connectors 310a, 310b, 310c and the connections 341a, 341b, 341c are protected from electromagnetic inference that could otherwise be present. In this way, the power supply module 342 improves the overall performance and usability of the electrical connectors 310a, 310b, 310c.

The energy storage module 344 is any type of device or collection of components capable of storing electrical energy. For example, the energy storage module 344 may be one or more electrolytic capacitors or one or more super capacitors. A super capacitor is a high-capacity capacitor that is generally capable of storing about 10 to 100 times more energy per unit volume that a electrolytic capacitor. In another example, the energy storage module 344 may be a rechargeable battery.

The output of the boost module 343 is electrically connected to the energy storage module 344 such that the boosted electrical energy is stored in the energy storage module 344. The energy storage module 344 is electrically connected to the electronic control 345 and provides power to the electronic control 345. The boost module 343 and the energy storage module 344 may be arranged in any manner known in the art. For example, the output of the boost module 343 may be a voltage, and the energy storage module 344 may be in parallel with the output of the boost module.

The power supply module 342 also may include additional components and circuitry to facilitate the storage of energy in the energy storage module 344 and the utilization of energy stored in the electronic storage module 344. For example, the power supply module 342 may include charging circuitry and/or metering circuitry.

Data from the sensor systems 355a, 355b, 355c is also provided to the electronic control 345 for analysis. The electronic control 345 includes an electronic processing module 346 and an electronic storage 347, and an input/output (I/O) interface 348. The electronic processing module 346 includes one or more electronic processors, each of which may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 347 may be any type of electronic memory that is capable of storing data and instructions in the form of computer programs or software, and the electronic storage 347 may include volatile and/or non-volatile components. The electronic storage 347 and the processing module 346 are coupled such that the processing module 346 can access or read data from and write data to the electronic storage 347.

The electronic storage 347 stores executable instructions, for example, as a computer program, logic, or software, that cause the processing module 346 to perform various operations. For example, the electronic storage 347 stores executable instructions that cause the processing module 346 to perform the process 400 discussed with respect to FIG. 4. To provide another example, the electronic storage 347 may store instructions that cause data from the sensor systems 355a, 355b, 355c to be stored on the electronic storage 347. The instructions also may include instructions that compare the data from the sensor systems 355a, 355b, 355c to one or more threshold values or specifications stored on the electronic storage 347. For example, the threshold values and/or specifications may specify a current and/or voltage amplitude that indicates a fault condition.

Although the above examples discuss an implementation in which the electronic control 342 receives data from the sensor systems 335a, 355b, 355c, other implementations are possible. For example, instead of receiving data from the sensor systems 335a, 335b, 335c, the electronic control 342 may receive the measured AC voltage and/or current from the sensor systems 335a, 335b, 335c and may determine the numerical value of one or more properties of the measured voltage and/or current. In these implementations, the electronic storage 347 includes instructions that, when executed by the processing module 346, implement techniques for filtering, analyzing, and/or preparing data from the voltage and/or currents provided by the sensor systems 355a, 355b, 355c.

Furthermore, the electronic storage 347 may store instructions for operating the electrical connectors 310a, 310b, 310c in an electrically ganged manner. The instructions may cause the electronic processing module 346 to generate command signals that cause all of the resettable current interrupting devices 320a, 320b, 320c to change state. For example, the electronic control 345 may send a command signal to each switch control 324a, 324b, 324c that causes the respective resettable current interrupting device 320a, 320b, 320c to open or close. In implementations in which the switch controls 324a, 324b, 324c are actuators, the command signals operate the actuator such that the resettable current interrupting devices 320a, 320b, 320c change state. For example, in implementations in which the actuator is an electromagnetic actuator, the command signal causes current to flow in the actuator such that a plunger of the actuator moves to thereby change the state of the current interrupting devices 320a, 320b, 320c.

The I/O interface 348 is any interface that allows the electronic control 345 to send and receive data. For example, the I/O interface 348 may be coupled to the switch controls 324a, 324b, 324c, and commands generated by the electronic control 345 may be provided to the electrical connectors 310a, 310b, 310c through the I/O interface 348.

In the example of FIG. 3, the control system 340 also includes the interaction module 349. The interaction module 349 receives power from the energy storage module 344 and data from the electronic control 345. The interaction module 349 may include, for example, an indication module that provides a perceivable indication of the status of the electrical connectors 310a, 310b, 310c and/or the control system 340. For example, the interaction module 349 may provide a perceivable indication of the state of the current interruption devices 320a, 320b, 320c.

Examples of components that may be included in the interaction module 349 include, without limitation, a display (such as a liquid crystal display (LCD)), a keyboard, audio input and/or output (such as speakers and/or a microphone), visual output (such as lights, light emitting diodes (LED)) that are in addition to or instead of the display, serial or parallel port, a Universal Serial Bus (USB) connection, and/or any type of network interface, such as, for example, Ethernet. The interaction module 349 also may allow communication with a separate electronic device without physical contact through, for example, an IEEE 802.11, Bluetooth, or a near-field communication (NFC) connection. The control system 340 may be, for example, operated, configured, modified, or updated through the interaction module 349.

The interaction module 349 also may allow the control system 340 to communicate with systems that are remote from the control system 340. For example, the interaction module 349 may include a communications interface that allows communication between the control system 340 and a remote station (not shown), or between the control system 340 and a separate electrical apparatus in the power system 100 (FIG. 1) using, for example, the Supervisory Control and Data Acquisition (SCADA) protocol or another services protocol, such as Secure Shell (SSH) or the Hypertext Transfer Protocol (HTTP). The remote station may be any type of station through which an operator is able to communicate with the control system 340 without making physical contact with the electrical connectors 310a, 310b, 310c or the control system 340. For example, the remote station may be a computer-based work station, a smart phone, tablet, or a laptop computer that connects to the control system 340 via a services protocol, or a remote control that connects to the control system 340 via a radio-frequency signal. The control system 340 may communicate information such as the state of the resettable current interrupting devices 320a, 320b, 320c to the remote station.

Other implementations are possible. For example, the control system 340 may be coupled to more than three electrical connectors or fewer than three electrical connectors and may provide common control for more or fewer than three electrical connectors.

Figure 4:
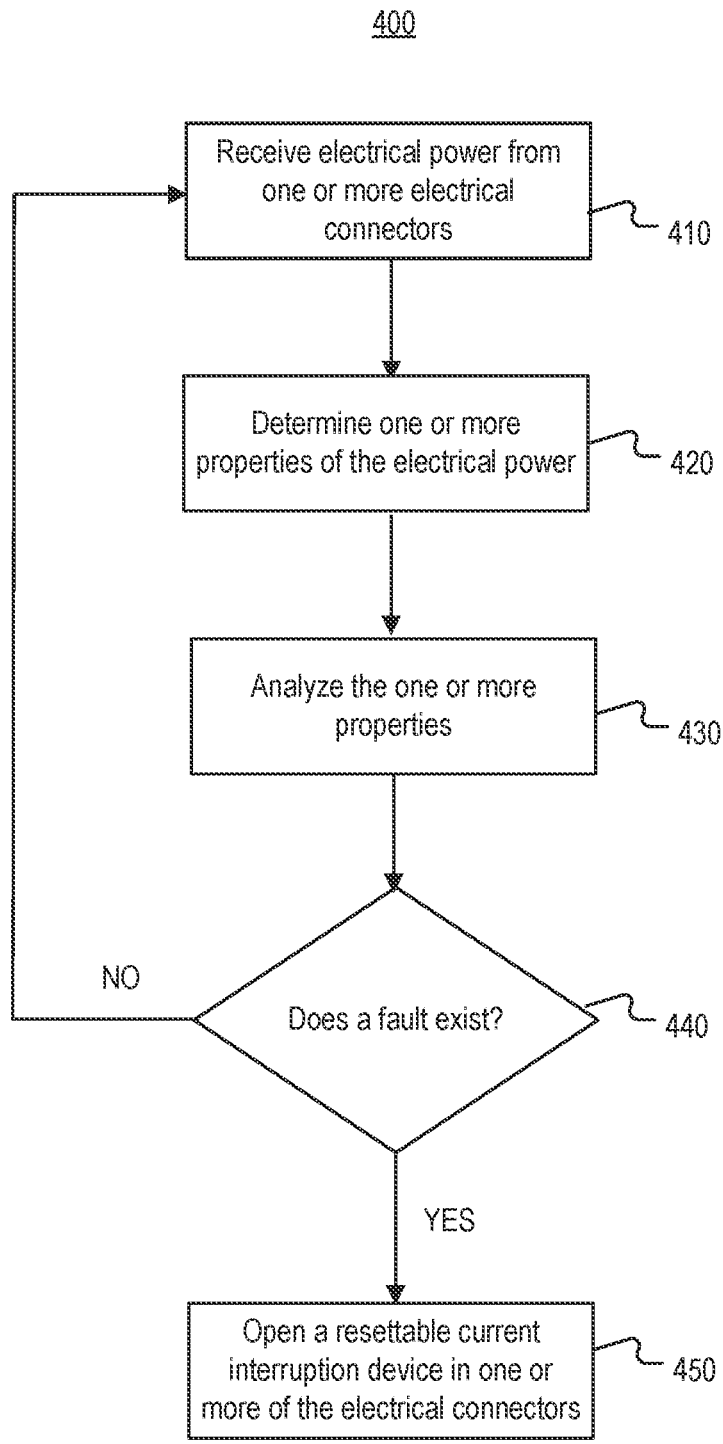
FIG. 4 is a flow chart of an example of a process for operating and controlling separable load-break electrical connectors with a common control.

FIG. 4 is a flow chart of a process 400. The process 400 is an example of a process for operating and controlling separable load-break electrical connectors with a common control. The process 400 is discussed with respect to the control system 340 and the electrical connectors 310a, 310b, 310c. In the example of FIG. 4, the process 400 is performed by the electronic control 345. However, the process 400 may be performed by other control systems. For example, the process 400 may be performed by the control system 140.

Electrical power is received from the electrical connector 310a, 310b, and/or 310c (410). The electrical power is harvested by the sensor systems 355a, 355b, 355c and provided to the electronic control 345 via the connections 341a, 341b, 341c as AC current and/or voltage. One or more properties of the electrical power are determined (420). The properties may be, for example, an amplitude or phase of the voltage or current at a particular time. The one or more properties may be expressed as a numerical value. Furthermore, the properties of the electrical power may be determined repeatedly over time. The vales of the one or more properties may be stored on the electronic storage 347. If current is not flowing in one or more of the electrical connectors 310a, 310b, 310c, the property is assigned a value of zero.

The electronic control 345 analyzes the one or more properties (430). By analyzing the one or more properties, the electronic control 345 may determine a status of the electrical connectors 310a, 310b, 310c. For example, the electronic control 345 may determine whether or not a fault exists in the phases A, B, C by comparing the one or more properties determined in (420) to a threshold value that is stored on the electronic storage 347. The threshold value may be a value of current or voltage that indicates that a fault is present. In these implementations, if the value of the measured current of voltage is equal to or greater than the threshold value, then the electronic control declares that a fault exists (440).

If no fault exists, the process 400 ends or returns to (410). If a fault exists, the electronic control 345 controls the electrical connectors 310a, 310b, and/or 310c. The electronic control 345 is configured to operate the electrical connectors 310a, 310b, 310c individually or in an electrically ganged manner. To operate the electrical connectors 310a, 310b, 310c in an electrically ganged manner in response to detecting a fault, the electronic control 345 provides a control signal to all of the switch controls 324a, 324b, 324c at substantially the same time such that all of the resettable current interruption devices 320a, 320b, 320c open at substantially the same time. The electronic control 345 is also configured to operate the electrical connectors 310a, 310b, 310c individually. In these implementations, the electronic control 345 provides the command signal to fewer than all of the switch controls 324a, 324b, 324c.

Although the process 400 is discussed with respect to controlling one or more of the electrical connectors 310a, 310b, 310c based on whether or not a fault exists, the process 400 may be used in other contexts. For example, the process 400 may be used to open all of the electrical connectors 310a, 310b, 310c when a fault does not exist so that maintenance may be performed on the loads 103.

Figure 5B:
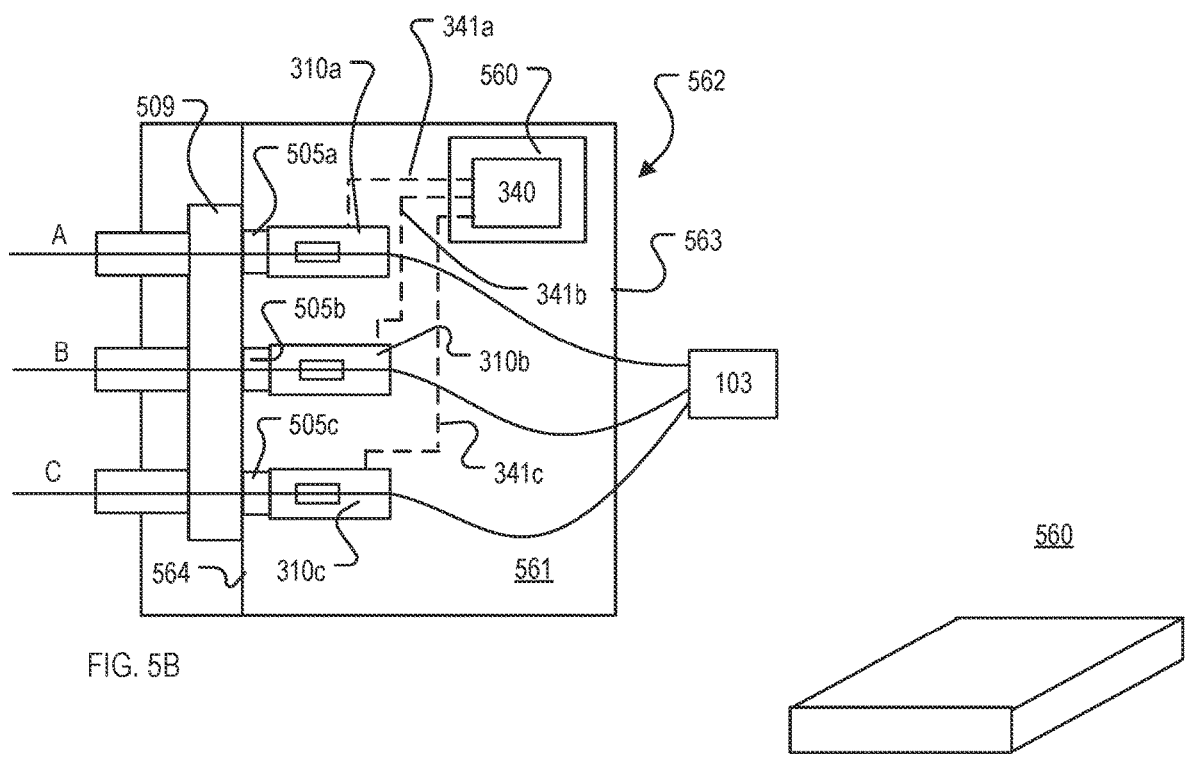
FIG. 5B is a top view of the interior of the cabinet of FIG. 5A.
Figure 5C:
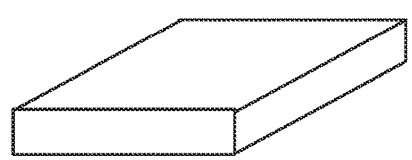
FIG. 5C is a perspective view of an enclosure that may be placed in the cabinet of FIG. 5C.

FIGS. 5A and 5B show an example of the electrical connectors 310a, 310b, 310c and the control system 340 as mounted in a cabinet 562. FIG. 5A is a side block diagram of an interior 561 of the cabinet 562. FIG. 5B is a top view of the interior 561 of the cabinet 562. FIG. 5C is a perspective view of an enclosure 560. The cabinet 562 is a three-dimensional body that includes walls 563 that define the interior 561. An electrical device 509 and the electrical connectors 310a, 310b, 310c are enclosed in the interior 561. The walls 563 may be made of any durable and solid material, such as, for example, sheet metal.

The electrical device 509 includes bushings 505a, 505b, 505c that pass through a support 564. The electrical device 509 is a three-phase device that is electrically connected to the phases A, B, C of the grid 101. The electrical device 509 is mounted to or held by the support 564. The electrical connector 310a is mechanically mounted to the bushing 505a and electrically connected to phase A, the electrical connector 310b is mechanically mounted to the bushing 505b and electrically connected to phase B, and the electrical connector 310c is mechanically mounted to the bushing 505c and electrically connected to phase C. The electrical connectors 310a, 310b, 310c are coupled to the control system 340 via the respective connections 341a, 341b, 341c. The control system 340 provides common control of the electrical connectors 310a, 310b, 310c as discussed above.

Referring also to FIG. 5C, the enclosure 560 provides electromagnetic shielding for the control system 340. The enclosure 560 may be a Faraday cage. The enclosure 560 may be made of an electrically conductive material and may be made of a mesh of electrically conductive material. The conductive material of the enclosure 560 causes electrical charges from an external electrical field to be distributed such that the electrical charges cancel the effect of the external electrical field on the control system 340. Thus, the enclosure 560 provides the control system 340 with protection from electromagnetic interference. Other implementations of the enclosure 560 are possible. For example, the enclosure 560 may be made of a material that is not electrically conductive, such as a dielectric material or a ceramic. Moreover, the control system 340 may be electrically isolated or protected from external electrical fields in other ways. For example, the control system 340 may be coated with an electrically insulating material such as a dielectric or a ceramic.

The arrangement shown in FIGS. 5A and 5B also provides a further example of how the control system 340 provides space savings and performance enhancements as compared to a system in which each electrical connector has a local control. In the example of FIGS. 5A and 5B, the control system 340 is attached to an interior side 563u of one of the walls 563. The interior side 563u is the interior side of the upper wall of the cabinet 562. Placing the control system 340 on the interior side 563u allows the control system 340 and the enclosure 560 to be easily accessed for maintenance. Moreover, the common control system 340 is separated from the electrical connectors 310a, 310b, 310c rather than being embedded within each electrical connector 310a, 310b, 310c. The separation provides open space between the control system 340 and the electrical connectors 310a, 310b, 310c and allows the control system 340 to more easily dissipate heat.

The enclosure 560 may be mounted in other locations within the interior 561. For example, the enclosure 560 may be mounted on an interior of one of the sidewalls of the cabinet 562.

The above implementations are within the scope of the claims. Other implementations are also within the scope of the claims.

What is claimed is:

1. An apparatus comprising:
a plurality of separable load break devices, each separable load break device comprising:
 a resettable current interruption device associated with operating states, the operating states comprising at least a first operating state that prevents current flow in the resettable current interruption device and a second operating state that allows current flow in the resettable current interruption device;
 a switch control configured to control the operating state of the resettable current interruption device;
 a connection interface configured to mechanically connect the separable load break device to a bushing of a separate electrical device and to electrically connect the resettable current interruption device to the separate electrical device, wherein the connection interface is configured to be secured to the bushing of the separate electrical device and removed from the bushing of the separate electrical device without damaging the bushing or the connection interface;
 a current path electrically connected to the resettable current interruption device and to an electrical interface; and
 a sensor system configured to harvest electrical power from the current path;
 the electrical interface, the electrical interface configured to electrically connect the resettable current interruption device to a load, wherein the apparatus further comprises:
a control system configured to provide electrically ganged operation of the plurality of separable load break devices, wherein the control system is separate from of the plurality of separable load break devices and is configured to receive electrical energy from the sensor system in each separable load break device.

2. The apparatus of claim 1, wherein the resettable current interruption device comprises a vacuum interrupter, and the switch control comprises:
an actuator coupled to a movable rod of the vacuum interrupter; and
a driving circuit configured to control the actuator.

3. The apparatus of claim 1, wherein the sensor system is further configured to monitor electrical power that flows in the current path.

4. The apparatus of claim 3, wherein the control system is coupled to the sensor system in each separable load break device.

5. The apparatus of claim 4, wherein each sensor system comprises one or more current sensors.

6. The apparatus of claim 5, wherein the one or more current sensors comprise a current transformer and/or a Rogowski coil.

7. The apparatus of claim 6, wherein the control system is further configured to control the switch control in each separable load break device such that the resettable current interruption device in each separable load break device is in the first operating state if a fault exists in the current path of one or more of the separable load break devices.

8. The apparatus of claim 4, wherein the control system is further configured to determine whether a fault exists in the current path of one or more of the separable load break devices based on the received electrical energy.

9. The apparatus of claim 4, wherein the control system comprises:
a power supply module configured to receive and store electrical energy from the sensor systems; and
a microcontroller configured to analyze the electrical energy from the sensor systems to determine whether a fault exists in one or more of the separable load break devices.

10. The apparatus of claim 9, wherein the power supply module is further configured to amplify the electrical energy from the sensor systems.

11. The apparatus of claim 1, wherein the control system is enclosed in a Faraday cage.

12. The apparatus of claim 1, wherein the control system comprises:
a power supply module configured receive harvested electrical energy from the plurality of separable load break devices, the power supply module comprising:
 a boost module configured to amplify the received electrical energy; and
 an energy storage apparatus configured to store the amplified electrical energy;
one or more electronic processors; and
an electronic memory, the electronic memory storing instructions that, when executed, cause the one or more electronic processors to:
 access information related to a current path of each of the separable load break devices;
 determine whether a fault exists in one or more of the separable load break devices based on the accessed information; and
 control the resettable current interruption device in all of the separable load break devices if a fault exists in one or more of the separable load break devices.

13. The apparatus of claim 12, wherein the one or more electronic processors are powered by the electrical energy stored in the energy storage apparatus.

14. The apparatus of claim 13, further comprising an input/output (I/O) module.

15. The apparatus of claim 12, wherein the one or more electronic processors and the electronic memory are part of a microcontroller.

16. The apparatus of claim 12, wherein, the information related to the current path of each of the separable load break devices comprises a measured AC current value in each current path.

17. The apparatus of claim 16, wherein the measured AC current value comprises a plurality of current measurements over time in each current path.

18. The apparatus of claim 1, wherein the control system is further configured to:
receive an indication of one or more properties of electrical power flow in the plurality of separable load break devices;
analyze the indication of the one or more properties to determine whether a fault exists in any of the plurality of separable load break devices; and
if a fault exists in any of the separable load break devices, command the switch control in each of the separable load break devices to open the resettable current interruption device in the separable load break device.

* * * * *